Figure 5A:
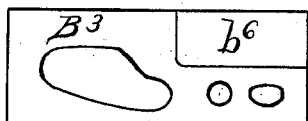

No. 663,236. Patented Dec. 4, 1900.
P. LOFY & H. C. ETTINGER.
AIR BRAKE INSTRUCTION CHART AND APPARATUS.
(Application filed Jan. 18, 1900.)
(No Model.) 7 Sheets—Sheet 1.
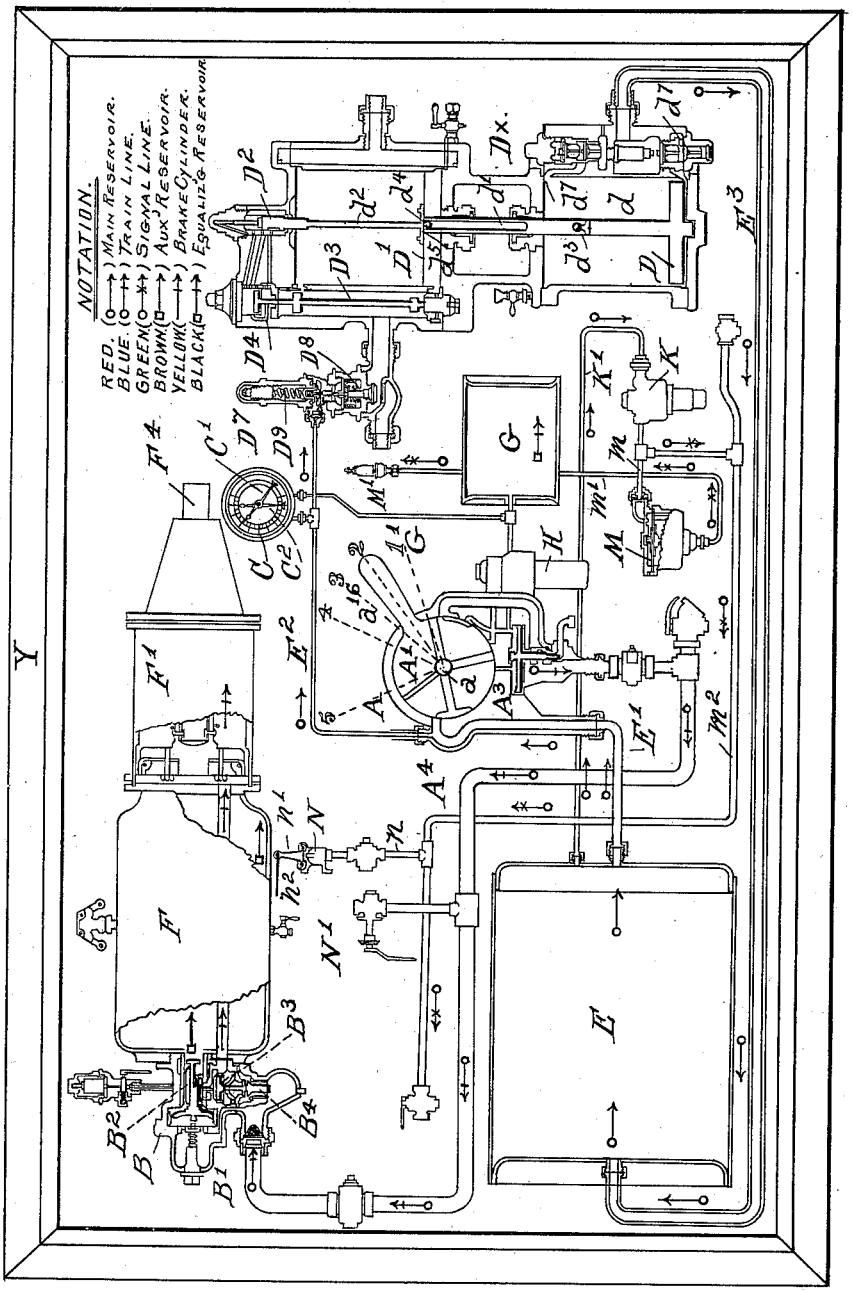
WITNESSES
INVENTORS
PETER LOFY AND HARRY C ETTINGER.
BY ATTY No. 663,236. Patented Dec. 4, 1900.
P. LOFY & H. C. ETTINGER.
AIR BRAKE INSTRUCTION CHART AND APPARATUS.
(Application filed Jan. 18, 1900.)
(No Model.) 7 Sheets—Sheet 2.
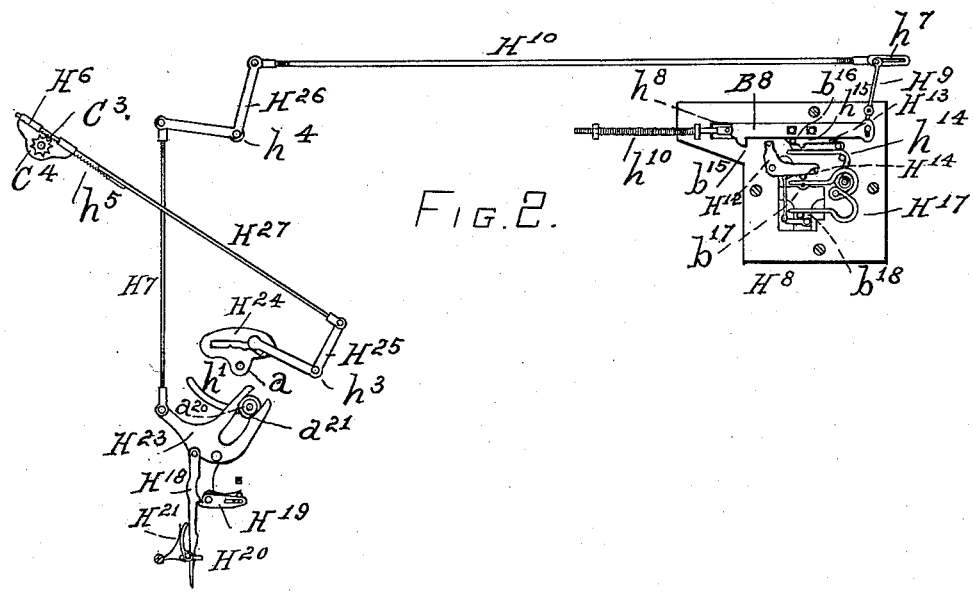
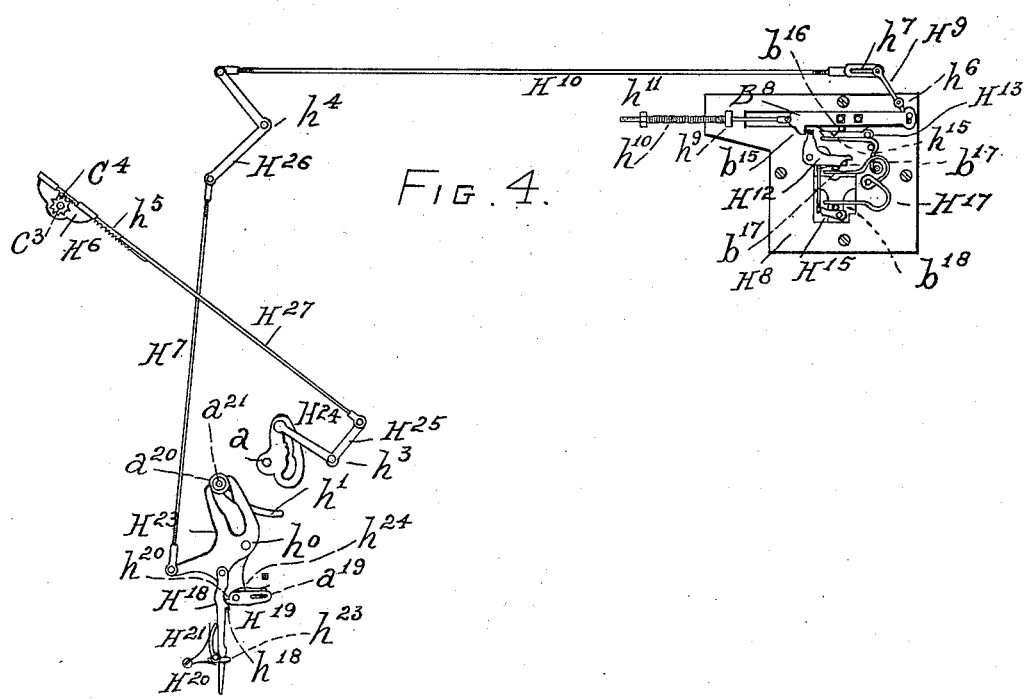
WITNESSES.
C. D. Justice
F. W. Maxwell
INVENTORS
Peter Lofy and Harry C. Ettinger.
By Atty N. DuBois.

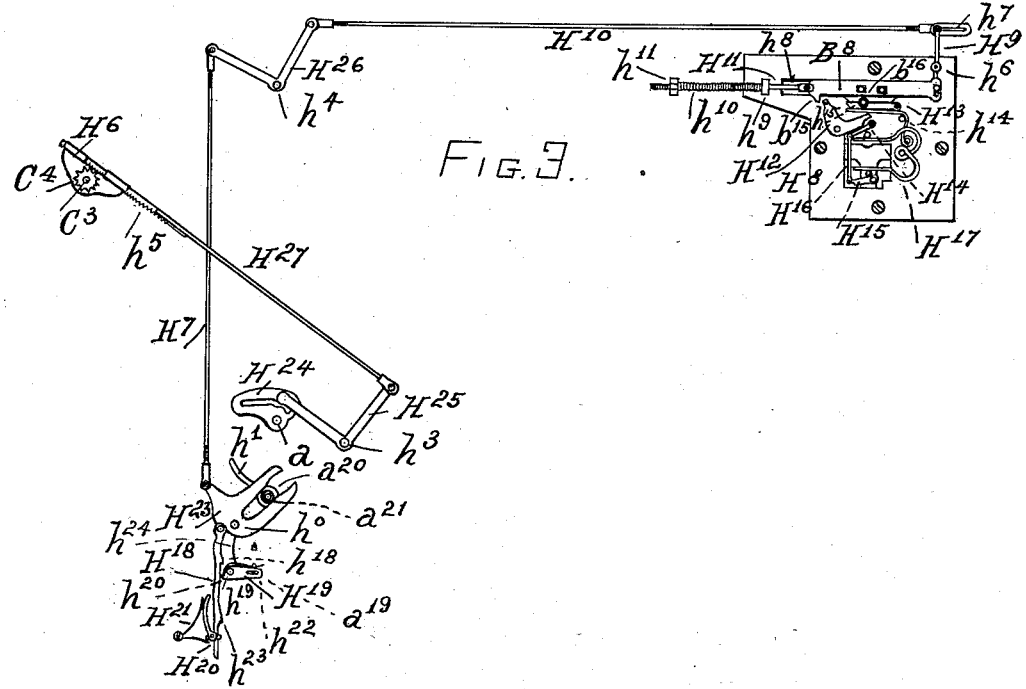
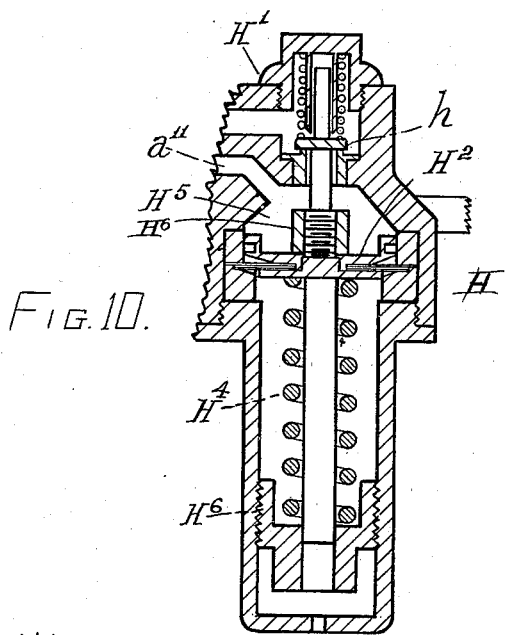
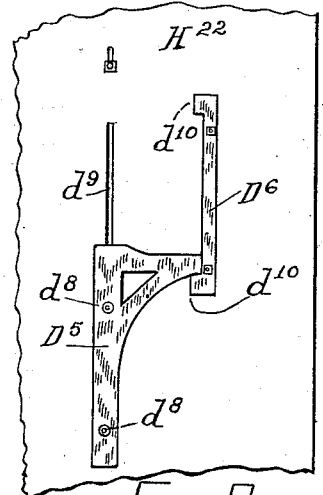

No. 663,236. Patented Dec. 4, 1900.
P. LOFY & H. C. ETTINGER.
AIR BRAKE INSTRUCTION CHART AND APPARATUS.
(Application filed Jan. 18, 1900.)
(No Model.) 7 Sheets—Sheet 4.

WITNESSES
C. D. Justice
F. W. Maxwell

INVENTORS
Peter Lofy and Harry C. Ettinger.
By Atty N. DuBois.

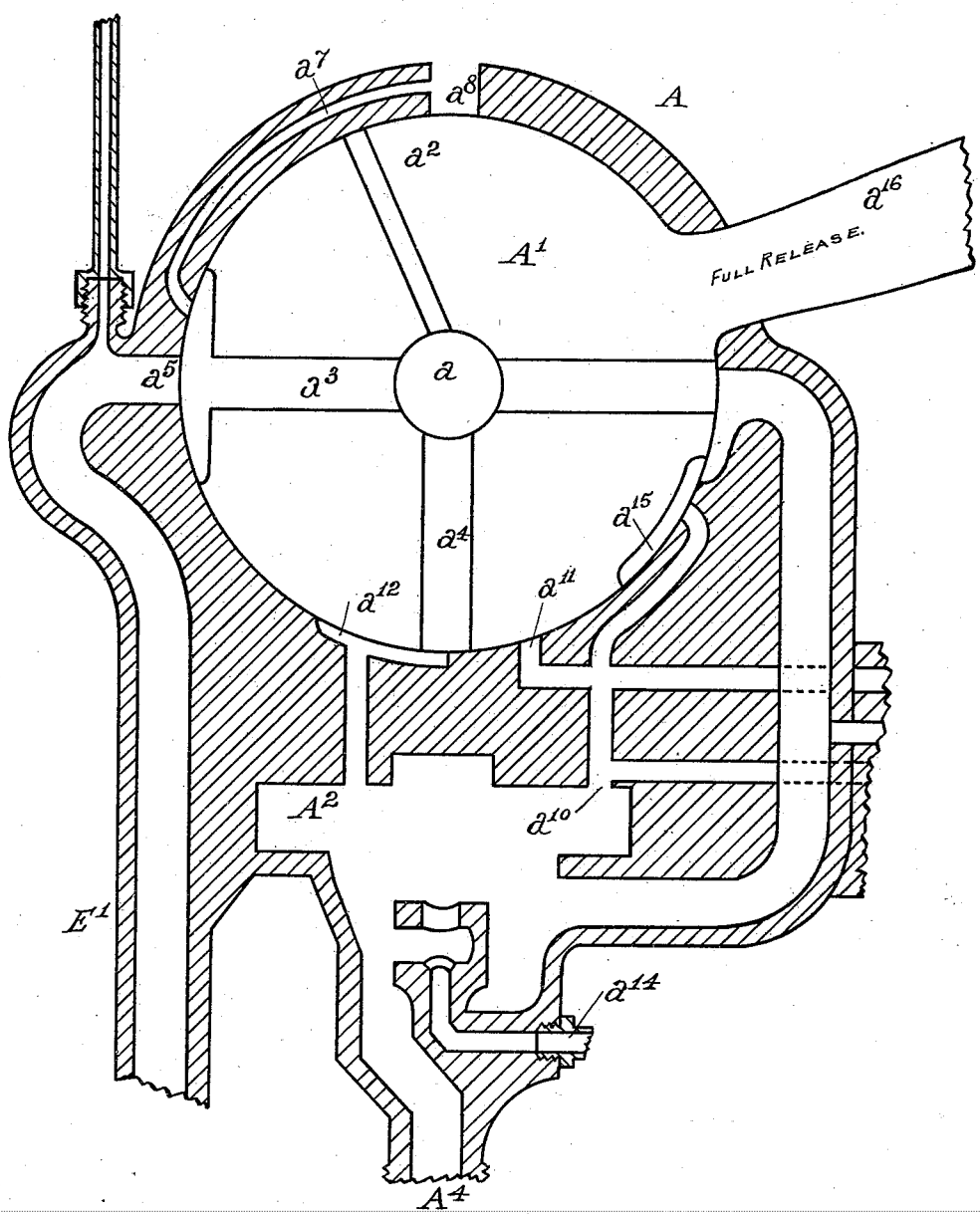

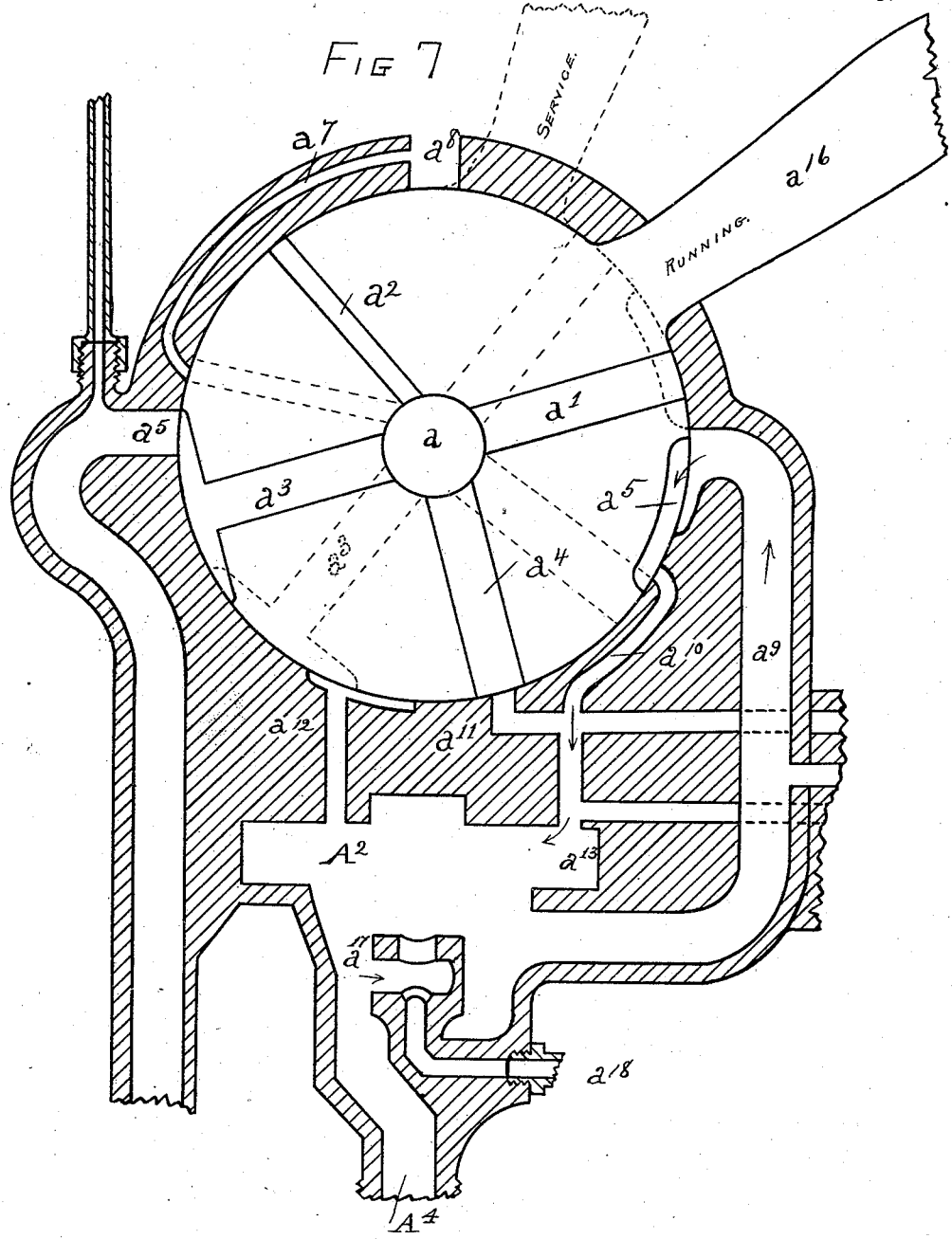

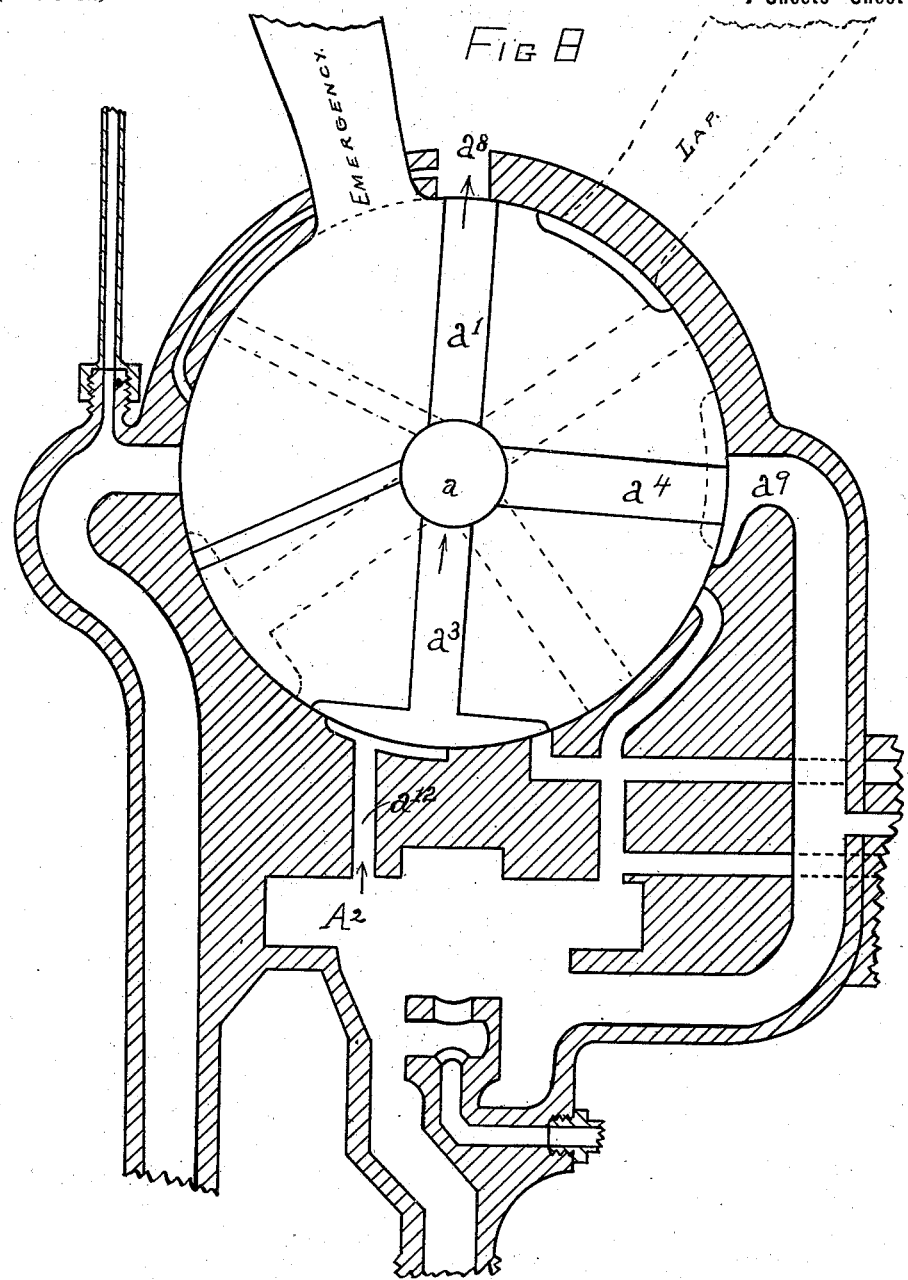

UNITED STATES PATENT OFFICE.

PETER LOFY AND HARRY C. ETTINGER, OF SPRINGFIELD, ILLINOIS.

AIR-BRAKE-INSTRUCTION CHART AND APPARATUS.

SPECIFICATION forming part of Letters Patent No. 663,236, dated December 4, 1900.

Application filed January 18, 1900. Serial No. 1,863. (No model.)

*To all whom it may concern:*

Be it known that we, PETER LOFY and HARRY C. ETTINGER, citizens of the United States, residing at Springfield, in the county of Sangamon and State of Illinois, have invented a certain new and useful Air-Brake-Instruction Chart and Apparatus, of which the following is such a full, clear, and exact description as will enable others skilled in the art to which it appertains to make and use our said invention.

Our invention relates to a system of instruction for railway-engineers and trainmen in the use of the quick-action automatic brake and appurtenances as applied and used on freight-trains.

In the drawings we have shown and we will hereinafter describe our system of instruction as applied to the quick-action air-brake system of the Westinghouse Air-Brake Company. It may, however, in its essential features be applied to other systems of air-brakes without material departure from our invention.

In the drawings we have for convenience in illustration and to facilitate instruction shown all the essential features of the air-brake system grouped in coöperative relation to each other.

The purposes of our invention are to exhibit in their proper relation all the essential features of an air-brake system and in connection therewith to exhibit movable parts which will clearly show to the student the changes of position of the valve mechanism and other parts which occur in practice during the use of the air-brake system and to show at a glance the results which follow from different movements of the engineer's brake-valve handle.

With these general ends in view our invention consists, broadly speaking, of a chart in which all the essential elements of an air-brake system are grouped as described; and it also consists in movable parts on the face of the chart, which may be moved to show various positions of the engineer's brake-valve handle, the different degrees of air-pressure, the movement of the valve mechanism of the air-pump, the movements of the piston and valve mechanism of the engineer's brake and equalizing discharge valve, and the movements of the piston, the slide-valve, the emergency-piston, and the check-valve of the quick-action triple-valve, and in connection with the movable parts on the face of the chart other movable parts on the back of the plate on which the chart is mounted which are so constructed and arranged and are connected with the engineer's brake-valve handle in such manner as to produce timely movement of the movable parts on the face of the chart in response to the movement of the engineer's brake-valve handle.

With these ends in view our invention consists in the novel grouping of representations of the various parts of an air-brake system and the novel construction and arrangement of parts shown in the annexed drawings, to which reference is hereby made, and hereinafter described, and pointed out in the claims.

Figure 5:
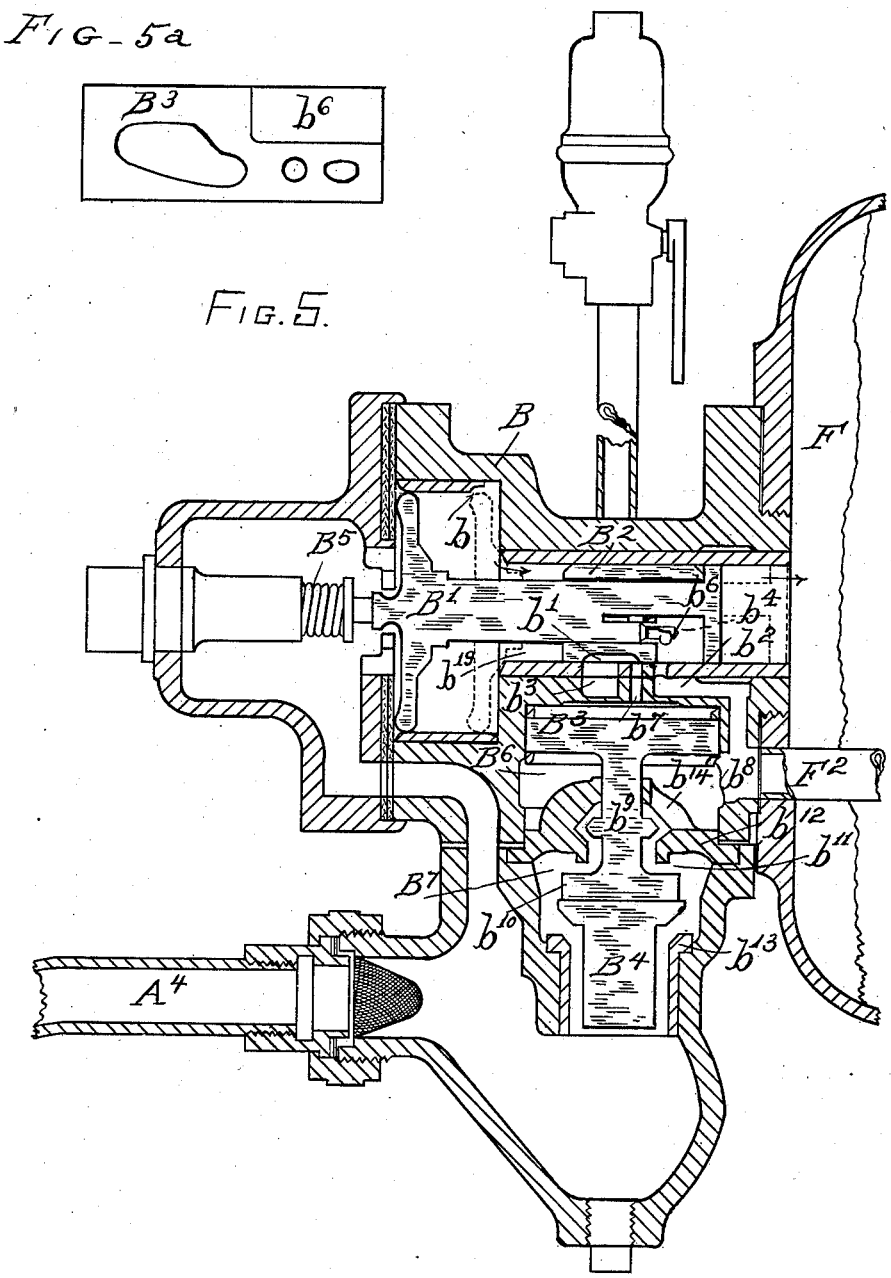

Referring to the drawings, Figure 1 is a front elevation of the complete apparatus. Fig. 2 is a rear elevation of the mechanism operating the triple-valve slides, the pressure-gage needle, and the slide representing the equalizing-valve, the parts being shown in the relative positions which they occupy when the engineer's brake-valve handle is set at "full release." Figs. 3 and 4 are rear elevations of the same mechanism, showing the same parts in the relative positions which they occupy when the engineer's brake-valve handle is set at "service" and "emergency," respectively. Fig. 5 is an enlarged sectional view of the triple valve and shows in place thereon the movable parts representing the valve mechanism of the quick-action triple valve. Fig. $5^a$ is a bottom plan view of the slide-valve $B^2$ of the triple valve and shows the location of the ports therein. Figs. 6, 7, and 8 are enlarged sectional views of the engineer's brake-valve, showing the valve set in the positions of "full release," "running," and "emergency," respectively. Fig. 9 is an enlarged rear elevation of the parts connected to and coöperating with the slidable parts on the front of the chart which serve to illustrate the valve mechanism of the air-pump. Fig. 10 is an enlarged sectional view of the feed-valve.

Similar letters of reference designate like parts in all of the views.

In the drawings on the face of the chart we have shown, partly in elevation and partly in vertical longitudinal section, the essential parts of the air-brake system, viz: the air-pump $D^X$ and its governor $D^7$, the engineer's brake and equalizing discharge valve A and appurtenances, the brake-valve reservoir G, the feed-valve H, the signal-valve M, the signal-reducing valve K, the main air-reservoir E, the conductor's valve N', the car discharge-valve N, the quick-action triple valve B and appurtenances, the auxiliary reservoir F, the brake-cylinder F', and the system of pipes connecting these several parts.

We have shown duplex air-gage C of the well-known pattern which simultaneously indicates the pressure in the main reservoir and the pressure in the train-pipe.

In the chart as published the courses of the air-currents will be indicated by different colors. For example, the pipe extending from the brake and equalizing discharge valve to the triple valve in connection with the auxiliary reservoir will be indicated in blue. The main reservoir, the pipe extending from the air-pump to the main reservoir, and the pipes connecting the main reservoir with the engineer's valve, the pressure-gage, the pump-governor, and the signal-reducing valve, and also the connection between the engineer's valve and the feed-valve will be colored red, and in like manner other colors will be used to indicate the connection between other parts of the apparatus. As it is impossible to show these colors, we will in the drawings indicate the several colors by symbols, as follows: red, by an arrow terminated by a circle; blue, by an arrow terminated by a circle and crossed by a transverse line; brown, by an arrow terminated by a square; yellow, by an arrow terminated by an "X;" green, by an arrow terminated by a circle and crossed by an "X," and black, by an arrow terminated by a square and crossed by an "X."

We have indicated by numerals "1," "2," "3," "4," and "5" on the face of the chart the several stages of movement of the engineer's brake-valve handle, respectively designating "full release," "running," "lap," "service," and "emergency," which indicate the various conditions under which the brake system operates. These terms will be hereinafter defined and explained.

The chart proper is mounted on a sheet of metal $H^{22}$ or other suitable material. The moving parts of the apparatus are mounted on said plate in coöperative relation to each other, as hereinafter described, and the whole apparatus and chart are inclosed in a suitable frame Y, as shown.

On the face of the chart as published are inscribed the names of the several parts in order that the student may have the proper nomenclature constantly before him and may readily fix it in his mind; but for the purpose of this description the parts will be indicated in the drawings by reference-letters, inasmuch as the small scale on which the drawings must be made precludes designating all of these parts by name.

Two moving parts overlie the sectional view of the engineer's brake and equalizing discharge valve—viz., the disk or rotary valve A' and the equalizing-piston $A^3$. The disk A' is secured to a pin $a$, which turns on the plate on which the chart is mounted and is connected with the mechanism on the back of the plate, as hereinafter described. The disk A' is painted black or some other distinguishing color and has painted thereon in a contrasting color the ways $a'$ $a^2$ $a^3$ $a^4$ and the ports $a^5$ and $a^6$. (See Fig. 6.) The equalizing-piston $A^3$ has vertical movement within the limits of the chamber $A^2$. The other ports and ways of the engineer's valve A are indicated by reference-letters, as follows, viz: $a^7$, preliminary exhaust-port; $a^8$, emergency exhaust-port; $a^9$, way communicating with the train brake-pipe; $a^{10}$, the equalizing-port; $a^{11}$, the feed-port; $a^{12}$, the preliminary exhaust-port; $a^{13}$, a way connecting with brake-valve reservoir; $a^{14}$, train-pipe exhaust, and $a^{15}$ a port communicating with the return-pipe in connection with the main reservoir and the pipe connecting the valve with the pressure-gage and the pump-governor.

Overlying the representation of the quick-action automatic triple valve B (see Fig. 5) are a horizontally-slidable plate B', representing the piston of the triple valve, a horizontally-slidable plate $B^2$, representing the graduating slide-valve of the triple valve, a vertically-slidable plate $B^3$, representing the emergency piston, and a vertically-slidable plate $B^4$, representing the check-valve. These parts have coöperative connection with the disk A' through the mechanism on the back of the plate on which the chart is mounted, the details of which will be hereinafter explained.

Overlying the representation of the pressure-gage C are two needles, one of which, C', is black and the other, $C^2$, of some contrasting color, such as red. The red needle $C^2$ is stationary and indicates on the dial ninety pounds' pressure, which is assumed to be the normal pressure in the main air-reservoir. The other needle is mounted to oscillate and is actuated by mechanism on the back of the plate and indicates different degrees of pressure, according to the conditions under which the air system is operated.

The needle C' has operative connection with the disk A through mechanism on the back of the plate, which will be hereinafter described.

Overlying the representation of the air-pump $D^X$ are slidable plates representing the following-named parts, viz: the air-piston D, the steam-piston D', a stem $d$, connecting the pistons D and D', the reversing slide-valve $D^2$, the main steam-valve $D^3$, and the reversing-piston $D^4$. These plates are connected with suitable guide-plates on the back of the plate on which the chart is mounted, as hereinafter explained.

In order that the uses and operation of our chart and apparatus may be clearly understood, it is necessary to describe briefly the Westinghouse improved quick-action automatic brake in connection with which our chart and apparatus are usable in giving instruction as to the operation and maintenance of said brake system.

The Westinghouse improved quick-action automatic air-brake consists of the following essential parts: first, the pump $D^x$, which furnishes the compressed air; second, the main reservoir E, in which the compressed air is stored; third, the engineer's brake and equalizing discharge valve A, which regulates the flow of air from the main reservoir into the brake-pipe for releasing the brake and from the main train or brake pipe to the atmosphere for applying the brake; fourth, the main train or brake pipe $A^4$, which leads from the engineer's brake and equalizing discharge valve and thence along the train, supplying the apparatus on each vehicle with air; fifth, the auxiliary reservoir F, which takes a supply of air from the main reservoir through the brake-pipe and stores it for use on its own vehicle; sixth, the brake-cylinder F', which has its piston-rod $F^4$ attached to the brake-levers in such manner that when the piston is forced out by air-pressure the brakes are applied; seventh, the improved quick-action automatic triple valve B, which is suitably connected to the main train-pipe, auxiliary reservoir, and brake-cylinder and is operated by the variation of pressure in the train brake-pipe so as to admit air from the auxiliary reservoir and under certain conditions from the train-pipe to the brake-cylinder, which applies the brakes, at the same time cutting off communication from the brake-pipe to the auxiliary reservoir, to restore the supply from the train-pipe to the auxiliary reservoir, at the same time letting the air in the brake-cylinder escape, which releases the brake; eighth, the couplings, (not shown,) which are attached to flexible hose and connect the train-pipe from one vehicle to another; ninth, the air-gage C of the duplex pattern, which shows simultaneously the pressure in the main reservoir and the train-pipe, and, tenth, the pump-governor $D^7$, which regulates the supply of steam to the pump $D^x$, stopping it when the maximum air-pressure desired has been accumulated in the train brake-pipe and reservoir. All of these parts and other auxiliary parts are illustrated in continuity on the face of the chart.

There are two distinct methods of applying the air-brake, viz.: (a) gradually for slowing the train or for station stopping and (b) rapidly in cases of emergency. There are likewise different applications of the air for the ordinary release of the brakes, for the quick release of the brakes, and for the adaptation of the air-service to the varying conditions under which the system is operated. The mere placing of the operating-handle $a^{16}$ of the engineer's brake-valve in the proper one of a number of different positions accomplishes any one of these results which is desired. The different applications of air resulting from different movements of the handle of the engineer's valve will now be described.

The term "full release" designates such application of the air as is necessary for the quick release of all of the brakes. When the handle $a^{16}$ of the engineer's valve is set at "full release," as shown in Fig. 6, the air from the main reservoir E flows at the full pressure of the main reservoir, which is assumed to be ninety pounds, through the pipe E', thence through the port $a^{15}$, the ways $a^3$, $a'$, and $a^9$ to the equalizing-chamber $A^2$, thence through the main train or brake pipe $A^4$ to the triple valve B, where it acts against and moves the piston B' to the right to the position indicated in dotted lines in Fig. 5, thereby uncovering the port $b$. The air then passes at the same pressure through the port $b$, thence downward behind the piston B' into the chamber $b^{19}$, occupied by the slide-valve $B^2$, whence it passes into the auxiliary reservoir F, charging it to the same pressure as that in the main reservoir and in the train-pipe. In this position air is also supplied at the same pressure through the ways $a^3$, $a^4$, and $a^{12}$ to the chamber $A^2$ above the equalizing-piston $A^3$, and passing thence through the ports $a^{13}$ charges the equalizing-reservoir G and passes at the same pressure through the pipe G' to the chamber of the gage C, which supplies the air operating the needle C'. Air also flows at the same pressure from the pipe E' through the pipe $E^2$ to the chamber of the gage C, which operates the needle $C^2$. Under this condition both needles of the gage indicate ninety-pounds pressure. This pressure is, however, greater than can be advantageously used in the train-pipe service and is employed, primarily, for charging the reservoirs F and G. This pressure is afterward reduced in the equalizing-reservoir G and the train-pipe by service application of the air, as hereinafter explained. When the handle $a^{16}$ is set at full release, the port $a^{15}$, the ways $a^3$ and $a'$, the port $a^9$, and the train-pipe $A^4$ are in communication. At the same time the ports $a^9$, $a^5$, $a^{10}$, and $a^{13}$ and the chamber $A^2$ are in communication and the ways $a^3$, $a^4$, and $a^{12}$ and the chamber $A^2$ are in communication. At this stage air at the main-reservoir pressure enters the chamber $A^2$ through the ports $a^{10}$ and $a^{12}$ and acts equally upon the entire upper surface of the piston $A^3$. When the handle $a^{16}$ is at full release, air at the main-reservoir pressure passes through the ports $a^{15}$, $a^7$, and $a^8$ to the atmosphere. The port $a^7$ is much smaller than the other ports, and the air rushing through it to the atmosphere produces a hissing or whistling sound, which serves as a warning-signal to keep before the engineer the fact that the brake-valve handle remains in the position of full release. If the brake-valve handle remains too long in this position, the train-pipe and auxiliary reservoir will be overcharged, thus causing needless waste of air. The warning-signal cautions the engineer to watch the gage C and turn the handle $a^{16}$ back to "running" as soon as the gage indicates the desired air-pressure in the auxiliary reservoir and train-pipe. After the desired pressure in the auxiliary reservoir and train-pipe is attained it may under ordinary conditions be maintained by leaving the handle $a^{16}$ in the position of running, which permits a reduced quantity of air, sufficient to compensate for leakage, to flow through the port $a^5$, the ways $a^3$ and $a^4$, and the ports $a^{11}$ and $a^{10}$ to the chamber $A^2$, and also through the ways $a''$, $a^{11}$, and $a^9$ to the train-pipe $A^4$, and also through the ways $a^{11}$ and $a^{13}$ to the feed-valve H, the equalizing-reservoir G, and the gage C. The train brake-pipe $A^4$ and the reservoirs F and G being charged to the desired pressure—say seventy pounds—the handle $a^{16}$ is moved to position 2, running. (See Fig. 7.) This closes the way $a'$ and air-pressure passes through the port $a^5$ and the ways $a^3$ and $a^4$ to the port $a^{11}$ and thence to the feed-valve H (see Fig. 10) and continues to flow under the supply-valve $h$ in the chamber H' until the pressure of air on the piston $H^2$ exceeds the resistance—say seventy pounds—of the spring $H^4$, when the piston $H^2$ and its attachments are forced downward and the supply-valve $h$ closes until the pressure in the train-pipe has been reduced below seventy pounds, when the valve $h$ is again automatically pushed open by the piston $H^2$ rising under the action of the spring $H^4$, thereby admitting air through the chamber $H^5$, restoring train-pipe pressure to seventy pounds. The equalizing-port $a^{10}$ is now in communication through the ports $a^9$ and $a^{15}$ with the chamber $A^2$, maintaining therein the train-pipe pressure of seventy pounds. The handle $a^{16}$ remains in this position so long as there is no occasion to apply or to release the brakes. The spring $H^4$ is adjustable by means of a nut $H^6$ to regulate the action of the valve. When the handle of the valve is in position 3, (lap,) as indicated in dotted lines in Fig. 8, all of the ports of the valve are blank and no air is admitted therethrough. In practice this position is taken only after service application of the air. When the handle $a^{16}$ of the valve is in the fourth position, (service,) the ports $a^{12}$, $a^3$, and $a^2$ are open and air from the chamber $A^2$ and the equalizing-reservoir G is discharged to the atmosphere through the ports $a^{12}$, $a^3$, $a^2$, and $a^7$, as indicated by dotted lines in Fig. 7, thus reducing the pressure above the piston $A^3$, which causes the greater pressure in the train-pipe below the piston to force it upward from its seat and permit escape of air to the atmosphere through the port $a^{17}$ and the exhaust connection $a^{18}$. The desired initial reduction of pressure in the chamber $A^2$ being made, the handle of the valve is moved backward to position 3. When the handle is in this position, air will continue to flow from the exhaust-fitting $a^{18}$ until the pressure in the train brake-pipe has been reduced to that in the chamber $A^2$. At this stage the piston $A^3$ is automatically forced to its seat by the preponderance of pressure acting on its upper surface.

During service application of the air the pressure against the front of the piston B' is reduced to the same extent as the pressure in the train brake-pipe $A^4$; but the pressure in the auxiliary reservoir F is greater than the pressure on the front end of the piston B' and acts against the rear end of the piston to move it forward (to the left) sufficiently to engage with the right-hand end of the slide $B^2$ and cause it to open the port $b^3$ and permit air to pass from the reservoir F through the ports $b^3$ and $b^2$ and through the pipe $F^2$ into the brake-cylinder F', where it acts against the piston $F^3$ and presses it outward, thereby moving the push-rod $F^4$ so as to apply the brake.

In order to release the brakes after service application, the handle $a^{16}$ should be turned backward to "full release." This movement permits the main-reservoir pressure to flow directly to the brake-pipe and thence to the triple valve, as already explained, and to act against the front end of the piston B', causing it to move inward and engage with and move the slide-valve $B^2$ inward into such position that the port $b'$ in the slide-valve $B^2$ is in registry with both of the ports $b^2$ and $b^3$, so that air from the brake-cylinder F' may escape to the atmosphere through the pipe $F^2$ and the ports $b^2$, $b'$, and $b^3$ and allow the spring (not shown) surrounding the push-bar within the piston to react and retract the push-bar $F^4$, thereby releasing the brake.

To apply the brakes to their fullest extent in an emergency, the handle $a^{16}$ is moved to the position shown in Fig. 8, which opens the ports $a^9$ and $a^{12}$, so that there is a rapid escape of air from the train-pipe $A^4$ and the chamber $A^2$ through the ports $a^4$, $a^3$, $a'$, and $a^8$ to the atmosphere. The rapid escape of air from the train-pipe causes a sudden reduction of pressure in front of the piston B' in the triple valve B. At this stage the excessive pressure in the reservoir F acts against the inner end of the piston B' to move the piston quickly outward to its full limit, with its outer end abutting against and compressing the graduating-spring $B^5$. As the piston B' moves outward it engages with and moves the slide-valve $B^2$ to the position shown in Fig. 5, in which position the port $b^4$, communicating with the auxiliary reservoir F, is in registry with the port $b^7$ opening into the chamber $B^6$, $b^8$ opening into the pipe $F^2$, which communicates with the brake-cylinder F'. The port $b^6$ in the slide-valve in communication with the auxiliary reservoir F is in registry with the port $b^2$ communicating with the pipe $F^2$ and permits air to pass from the auxiliary reservoir F directly into the brake-cylinder F'. A disk valve $b^{10}$, connected by a stem $b^9$ with the piston $B^3$, seats on a seat $b^{11}$ on the under side of a diaphragm $b^{12}$, separating the chambers $B^6$ and $B^7$. A check-valve $B^4$ seats on a seat $b^{13}$ in the chamber $B^7$. The chamber $B^7$ communicates with the chamber $B^6$ through a port $b^{14}$.

When the ports B', $B^2$, $B^3$, and $B^4$ are in the relative positions shown in Fig. 5, the valve $b^{10}$ has been pushed downward by air from the reservoir F entering through the ports $b^4$ and $b^7$ and acting against the upper surface of the piston $B^3$, thereby permitting the air in the chamber $B^7$ above the check-valve $B^4$ to pass through the ports $b^{14}$ and $b^8$ into the pipe $F^2$ and thence to the brake-cylinder F'. Simultaneously with the reduction of the air-pressure in the chamber $B^7$, as described, the accumulated air in the train-pipe $A^4$ rushes at approximately train-pipe pressure into the chamber $B^7$ and thence to the brake-cylinder, supplementing and increasing the pressure therein, so as to cause quick application of the brake at the maximum air-pressure. When the pressure in the train-pipe $A^4$ becomes sufficiently reduced by the escape of air through the ports $a^3$, $a^4$, $a'$, and $a^8$ in the brake-valve A, the spring $H^{17}$ (see Fig. 2) reacts to move the check-valve $B^4$ downward and cause it to seat on its seat $b^{13}$. At this stage of the operation the spring $B^5$ reacts and pushes the piston inward sufficiently to close the port $b^6$, whereupon air from the pipe $F^2$ acts against the under side of the piston $b^8$ and raises it sufficiently to cause the disk valve $b^{10}$ to seat on its seat $b^{11}$. The train-pipe $A^4$ is then recharged in the same manner that it was originally charged, and when the pressure in the train-pipe is restored to an amount in excess of that in the auxiliary reservoir F air flows from the pipe through the port $b$ into the reservoir F and recharges the reservoir.

In the herein-described apparatus the plate $B^3$, representing the emergency-piston, is caused to move upward simultaneously with the plate $B^4$, representing the check-valve, by the reaction of the upper member of the spring $H^{17}$ in engagement with the pin $b^{17}$ on the back of the plate $B^3$, and in the apparatus this movement of the plates represents the actual movements of the emergency-piston and the check-valve of a quick-action triple-valve, such as is commonly used in connection with air-brakes. The pin $a$ of the disk A' extends through the plate $H^{22}$. A slotted plate $H^{24}$ is secured to and turns with the pin $a$. A bell-crank lever $H^{25}$ is supported and turns on a pin $h^3$ on the plate $H^{22}$ and has at one end a roulette, which travels in the eccentric slot in the plate $H^{24}$. A short shaft $C^3$ extends through the plate $H^{22}$. The needle C' is secured to one end of the shaft and a cog-pinion $C^4$ is secured to the other end of the shaft, and the shaft turns in the plate. A guide-plate $H^6$ is secured to the plate $H^{22}$ and the rack $H^5$ slides therein. The rod $H^{27}$ is connected at one end with the bell-crank lever $H^{25}$ and has near its other extremity cog-teeth $h^5$, which mesh with the teeth in the pinion $C^4$. When the handle $a^{16}$ is in the position of full release, the needle $C^2$ points to "90" on the gage. If then the handle $a^{16}$ be moved to the left to "running," the plate $H^{24}$ will be turned to the left to the same extent, thereby operating the bell-crank $H^{25}$ and moving the rod $H^{27}$ sufficiently to cause the rack $h^5$ to turn the pinion $C^4$ sufficiently to cause the needle C' to point to "70" on the gage. A pin $a^{20}$ on the disk A' projects through and travels in a segmental slot $h'$ in the plate $H^{22}$. A roulette $a^{21}$ turns on the pin $a^{20}$ and works in the fork of the bell-crank lever $H^{23}$, which turns on a pin $h^9$ on the plate $H^{22}$. A bell-crank lever $H^{26}$ turns on a pin $h^4$ and is connected with the bell-crank $H^{23}$ by a rod $h^7$. A downwardly-extending rod $H^{18}$ is pivotally connected with the bell-crank $H^{23}$ and has on one edge a lug $h^{18}$. The lower part of the rod $H^{18}$ slides in a box-shaped guide $H^{20}$ on the plate $H^{22}$. A spring $H^{21}$, suitably connected with the plate $H^{22}$, acts against a pawl pivoted on the slide $H^{20}$, and the pawl bears against the rod $H^{18}$. The spring $H^{21}$ and the pawl serve to press the rod $H^{18}$ to the right. Near the lower extremity of the rod $H^{18}$ is a stop $h^{23}$, which engages with the upper end of the guide $H^{20}$ and serves to limit the downward movement of the rod. A pin $a^{19}$ on the back of the piston-slide $A^3$ projects through and travels in a slot in the plate $H^{22}$. A lever $H^{19}$ is fulcrumed on a pin $h^{19}$ and has at one extremity a lug $h^{20}$, with which the lug $h^{18}$ on the rod $H^{18}$ engages. Near the other extremity of the lever is a slot $H^{22}$, in which the pin $p^{19}$ fits loosely. When the handle $a^{16}$ is set at full release the rod $H^{18}$ descends and the lug $h^{18}$ engages with the lug $h^{20}$ on the lever $H^{19}$, depressing that end of the lever and raising the other end, thereby raising the slide $A^3$ to the position which the piston occupies in the equalizing-chamber when the engineer's brake-handle is at full release. The same movement of the brake-handle operates the bell-crank $H^{25}$ and by means of the rod $H^{27}$ the rack $h^{25}$, and the pinion $C^4$ turns the needle C' to the zero-point on the gage.

A plate $H^8$ is suitably secured on the plate $H^{22}$ and is recessed or cut away to accommodate the parts of the mechanism, as hereinafter explained.

A slide $B^8$ is suitably connected with the slide B', representing the piston of the triple valve and is slidable in the slot $h^8$ in the plate $H^8$. Each movement of the slide $B^8$ produces corresponding movement of the slide B'. A pin $b^{16}$, secured to the plate $B^2$, representing the slide-valve, projects through suitable slots in the plates $H^{22}$ and $H^8$. A lever $H^9$ has its fulcrum $h^6$ on the plate $H^8$ and its lower end is connected with the slide B³ and its upper end is connected with the rod H¹⁰, which is pivotally connected with the bell-crank H²⁶. A rod H¹¹ is pivotally connected with one extremity of the slide B⁸ and travels in a guide $h^9$ on the plate H⁸. Near the outer extremity of the rod H¹¹ is a collar $h^{11}$. A coiled spring $h^{10}$ surrounds the rod between the guide $h^9$ and the collar $h^{11}$, which is compressed when the slide B⁵ is moved to the right and which reacts to move the slide to the left.

Near one extremity of the rod H¹⁰ is a slot $h^7$, which permits limited movement of the rod without moving the lever H⁹. A latch H¹³ is pivotally connected with the plate H⁸ and has in its upper edge a notch $h^{15}$ in which the pin $b^{16}$ engages. A spring $h^{14}$ is connected with the plate H⁸ and acts against the lower edge of the latch H¹³ to move the latch upward and keep it in contact with the pin $b^{16}$. A lever H¹² is fulcrumed on the plate H⁸ in such position that the lug $b^{15}$ on the slide B⁸ will engage with the upper end of the lever. A lever H¹⁴ is fulcrumed on the plate H⁸ and has at one extremity a lug with which the extremity of the right-hand member of the lever H¹² engages to turn downward the right-hand end of the lever H¹⁴. An arm H¹⁵ is pivotally connected with the plate H⁸. A rod H¹⁶ connects the free end of the arm H¹⁵ with the left-hand end of the lever H¹⁴. A pin $b^{17}$ on the plate B³, representing the emergency-piston, extends through and travels in a slot in the plate H⁸. A pin $b^{18}$, secured to the plate B⁴, representing the check-valve, projects through and travels in a suitable slot in the plate H²². A double spring H¹⁷ is suitably connected with the plate H⁸, and the upper member of the spring acts upwardly against the pin $b^{17}$ and its lower member acts downwardly against the pin $b^{18}$.

When the handle $a^{16}$ is set at "full release," the parts occupy the relative position shown in Fig. 2, the slide B⁸ being at the full left-hand limit of its throw, the pin $b^{16}$ being on top of the latch H¹³, the spring H¹⁷ being relaxed, the pin $b^{17}$ being at the upper limit of its movement, and the pin $b^{18}$ being at the lower limit of its movement.

When the lever $a^{16}$ is set at "running," the parts occupy the position shown in Fig. 3, the slide B⁸ having been moved to the right sufficiently to permit the pin $b^{16}$ to engage in the notch $h^{15}$ of the latch H¹³. This slight movement of the slide B⁸ moves the plate B' on the face of the chart to the left sufficiently to close the port $b$, (clearly shown in Fig. 5,) that being the position which the triple-valve piston occupies when the engineer's brake-handle is set at running. When the handle $a^{16}$ is set at "lap," there is no change in the position of the parts now being described, except that the valve B² has moved to the right sufficiently to close the port $b^6$ of the graduating-valve. (See Fig. 5.)

In setting the handle $a^{16}$ at "service," the slide B' is moved to the left an additional distance sufficient to cause the shoulder on the slide B' to engage with and move the slide B² to an extent sufficient to uncover the port $b^2$. (See Fig. 5.) The same movement of the handle $a^{16}$ produces movement of the bell-crank H²⁵, which moves the rack $h^5$ a distance sufficient to turn the needle C' so as to indicate on the gage the degree of reduction in pressure resulting in service application of the air.

When the handle $a^{16}$ is set at "emergency," the parts occupy the relative position shown in Fig. 4, in which the slide B⁸ is thrown to the right to its full limit. The lug $b^{15}$ on the slide B⁸ has engaged with the lever H¹² and turned the right-hand end of the lever downward, which in like manner has engaged with and turned downward the right-hand end of the lever H¹⁴, which in turn has engaged with and pushed downward the pin $b^{17}$, thereby moving downward the slide B³ on the face of the chart representing the emergency-piston, and the left-hand end of the lever H¹⁴, in connection with the arm H¹⁵, has caused the arm to engage with and raise the pin $b^{18}$, thereby raising the slide B⁴, representing the check-valve on the face of the chart. The same movement of the handle $a^{16}$ has caused the rod H¹⁸ to move downward and the lug $h^{18}$ thereon to engage with the lug $h^{20}$ and move upward the right-hand end of the lever H¹⁹. This upward movement of the lever H¹⁹ produces corresponding upward movement of the slide A³, representing the piston in the equalizing-chamber A². The lug $h^{18}$ having passed the lug $h^{20}$, the lever H¹⁹, acted against by the spring $h^{24}$, returns immediately to its initial position.

When the handle $a^{16}$ is pushed back to "full release," the plate H²⁴ operates the bell-crank H²⁵ and the rack and pinion to return the needle C' to its initial position. The forked bell-crank H²³ operates to raise the rod H¹⁸ and permit the spring $h^{24}$ to restore the lever H¹⁹ to its initial position and, acting by means of the rod H²⁷ and the bell-crank H²⁶, brings the rod H¹⁰ to its initial position, which permits movement of the upper end of the lever H⁹ in the slot $h^7$. The springs $h^{10}$ and H¹⁷ then react to restore the parts B', B², B³, and B⁴ to their initial positions.

The air-piston D and the steam-piston D' are connected by the rod $d$. In the stem $d$ is a longitudinal channel $d'$ in which the stem $d^2$ slides. The knob $d^3$ on the stem $d$ serves as a handle by which the stem $d$ and connected parts may be moved up or down to illustrate the movements of the steam-piston and the air-piston. At the upper part of the stem $d^2$ is a slide D², integral with the stem, representing the slide-valve regulating the supply of steam to the steam-cylinder. At the lower extremity of the stem $d^2$ is a knob $d^4$, with which a cross-piece $d^5$ at the upper extremity of the stem $d$ engages to move the stem $d^2$ downward to such extent as may be necessary for the valve D² to close the ports supplying steam to the cylinder above the piston D' and open the ports supplying steam below the piston, so as to reverse the motion of the piston. The piston is thus reciprocated by the alternate admission of steam above and below the piston. The downward movement of the piston D compresses the air under the piston and forces it out through the ports $d^7$ into the pipe $E^3$, through which it is conveyed to the main air-reservoir E. Upward movement of the piston D' in like manner compresses the air above the piston and forces it out through the upper port $d^7$ into the pipe $E^3$. The slide $D^2$ represents the reversing slide-valve. The slide $D^3$ represents the main steam-valve, which controls the admission of steam to the steam-piston of the pump and its exhaust through suitable ports, which are alternately opened and closed by the valve $B^3$ and the reversing-piston $D^4$. A bracket-shaped slide $D^5$ (see Fig. 9) is connected with the stem $d$ by bolts $d^8$, which pass through and slide in a slot $d^9$ in the plate $H^{22}$. A guide-plate $D^6$ is secured to the plate $H^{22}$ and has near its extremities lugs $d^{10}$, which limit the upward and downward movement of the slide $D^5$ and serve to steady the motion of the slide.

The pump-governor $D^7$ is connected with the pipe E' by a pipe $E^2$. The governor-valve $D^7$ is similar in general construction to the equalizing discharge-valve already described. Excessive pressure in the valve $D^7$ acts against the spring in the valve to close the throttle $D^8$, supplying steam to the steam-cylinder of the air-pump, thereby stopping the pump until the air-pressure is reduced by service-application or by leakage below the normal pressure. When this occurs, the spring $D^9$ reacts to open the throttle and admit steam to the cylinder and again start the air-pump.

The signal-reducing valve K is connected with the main reservoir E by a pipe K'. The valve K is similar in construction to the equalizing discharge-valve H. The signal-valve M is connected with the valve K by a pipe $m$. A whistle M' is connected with the signal-valve M by a pipe $m'$. The train-signal pipe $m^2$ communicates with the pipe $m$. The car discharge-valve N is connected with the pipe $m^2$ by a pipe $n$. A lever $n'$ is mounted on top of the valve N and is operated by the cord $N^2$, passing through the cars of the train on which the brake is used. A piston within the valve is pressed upward against its seat by a spring, and its stem extends upward in contact with the lower extremity of the lever $n'$. Movement of the lever $n'$ either to the right or to the left depresses the piston and permits air to escape to the atmosphere through a port in the valve N. This produces a reduction of pressure in the pipe $m^2$, which correspondingly reduces the pressure above the diaphragm $M^2$, whereupon the excessive air-pressure under the diaphragm raises the diaphragm and causes it to open a valve communicating with the pipe M', and thereby admit air into the pipe $m'$, by which it is conveyed to the whistle, where it produces noise which apprises the engineer of the reduction in air-pressure. If the pressure in the main reservoir E becomes excessive, it acts against the spring in the valve K to open the valve and pass therethrough to the signal-valve M, where it acts upon the diaphragm and causes the sounding of the whistle, as already described.

The movable parts—such as the disk A', the slides B' $B^2$ $B^3$, &c.—in juxtaposition to the representations of the various mechanisms of an air-brake, as shown in the drawings and hereinbefore described, are not themselves in operative relation to the mechanism represented on the face of the chart, but serve only to simulate and give ocular demonstrations of the movements of the corresponding operative parts of the several mechanisms.

Having fully described our invention, what we claim as new, and desire to secure by Letters Patent, is—

1. In a chart and apparatus of the class described, the combination of a chart embodying representations of a number of different mechanisms of an air-brake system shown in operative relation to each other, movable parts on said chart representing like movable parts of the mechanisms represented and connecting devices operatively connecting said movable parts; all coöperating to show in timely succession the interdependent movements of the coöperating parts of the several mechanisms represented, as set forth.

2. In a chart and apparatus of the class described, the combination of a chart embodying a representation of a quick-action triple valve, superimposed movable parts representing corresponding parts of a triple valve, means operatively connecting said movable parts and means for moving said superimposed movable parts in simulation of the movements of the corresponding parts of a triple valve, as set forth.

3. In a chart and apparatus of the class described, the combination of a chart embodying a representation of an engineer's brake-valve and representations of other mechanisms of an air-brake system shown in coöperative relation to the engineer's brake-valve, a disk having representations of ways and ports and oscillative on the representation of the engineer's brake-valve, movable parts superimposed on the representations of the other mechanisms shown in coöperative relation to the engineer's brake-valve, and means operatively connecting said movable parts with said oscillative disk, substantially as set forth.

4. In a chart and apparatus of the class described, the combination of a representation of an engineer's brake-valve, an oscillative disk and a slidable plate in juxtaposition to said representation of an engineer's brake-valve, and means operatively connecting said plate with said disk, as set forth.

5. In a chart and apparatus of the class described, the combination of a steam-pump and air-compressor, a superimposed movable part representing the valve of the steam-pump and a superimposed coöperating movable part representing the pistons of the steam-pump and air-compressor, as set forth.

6. In a chart and apparatus of the class described, the combination of a chart embodying representations of an engineer's brake-valve and a pressure-gage, a disk oscillative on the representation of an engineer's brake-valve, a needle oscillative on the representation of a pressure-gage and means operatively connecting said needle with said disk, substantially as set forth.

7. In a chart and apparatus of the class described, a supporting-plate and a chart mounted on said plate and embodying representations of a duplex air-pressure gage, an engineer's brake-valve and a quick-action triple valve; in combination with an oscillative needle $C'$, an oscillative disk $A'$, slidable plates $A^3$, $B'$, $B^2$, $B^3$, $B^4$, means for converting oscillative movement of said disk into intermittent oscillative movement of said needle, means operated by said disk and adapted to push the plate $A^3$ downward, means adapted to quickly retract said plate, means operated by said disk and adapted to push the slides $B'$ and $B^2$ inward, means adapted to push the plate $B^3$ downward and pull the plate $B^4$ upward, and means adapted to simultaneously return the slides $B'$ and $B^2$ and the plates $B^3$ and $B^4$ to their initial positions, substantially as set forth.

8. In an apparatus of the class described, the combination of a supporting-plate, slides $B'$ and $B^2$ and plates $B^3$ and $B^4$ slidable on said plate, a slide $B^8$ connected to and slidable with the plate $B'$ and having a downwardly-extending lug, a bell-crank lever $H^{12}$ adapted to be engaged by the lug on the slide $B^8$, means for reciprocating the slide $B^8$, a lever $H^{14}$ in operative relation to the bell-crank lever $H^{12}$ and engaging with a pin on the plate $B^3$, a lever $H^{15}$ engaging with a pin on the plate $H^4$, a rod connecting the levers $H^{12}$ and $H^{15}$, and a spring acting oppositely against the pins on the plates $B^3$ and $B^4$, all coöperating, substantially as shown and described.

9. In an apparatus of the class described, the combination of a supporting-plate, a slide $B'$ and a plate $B^2$ slidable on the supporting-plate, a slide $B^8$ connected to and slidable with the slide $B'$, means for reciprocating the slide $B^8$, a notched latch $H^{13}$ engaging with a pin on the plate $B^2$, and a spring acting against said latch, as set forth.

10. In an apparatus of the class described, the combination of a supporting-plate, a disk mounted to oscillate on said plate, a slotted plate connected to and oscillating with said disk, a needle mounted to oscillate on the supporting-plate, a cog-pinion connected with said needle, a bell-crank lever operated by said slotted plate and a rod connected with said bell-crank and having a rack meshing with said cog-pinion, as set forth.

11. In an apparatus of the class described, the combination of a supporting-plate, a disk and a slotted plate connected together and oscillative on the supporting-plate, a forked bell-crank lever oscillative on the supporting-plate, means operatively connecting said bell-crank lever with said disk, a plate $A^3$ slidable on the supporting-plate, a lever $H^{19}$ engaging with a pin on the plate $A^3$, a spring acting against the lever $H^{19}$, and a rod $H^{18}$ connected with the forked bell-crank lever and engaging with the lever $H^{19}$, as set forth.

12. In an apparatus of the class described, the combination of a supporting-plate, a disk and a needle mounted to oscillate on said plate, a slide $B'$ and plates $A^3$, $B^2$, $B^3$ and $B^4$ slidable on said supporting-plate, a slotted plate oscillative with said disk, a bell-crank $H^{25}$ operated by said slotted plate, a rod $H^{27}$ connected with the bell-crank $H^{25}$ and having a rack, a cog-pinion connected with said needle and meshing with the rack on the rod $H^{25}$, a forked bell-crank operated by said disk, a secondary bell-crank, a rod connecting said secondary bell-crank with said forked bell-crank, a slide $B^8$ adapted to engage with a bell-crank and connected with the slide $B'$, a lever connected with the slide $B^8$, a rod connecting said last-named lever with the secondary bell-crank, a spring acting against the slide $B^8$, a bell-crank $H^{12}$ engaged by the slide $B^8$, a secondary lever $H^{14}$ engaged by the bell-crank $H^{12}$ and engaging with a pin on the plate $B^3$, a lever $H^{15}$ engaging with a pin on the plate $B^4$, a rod connecting the levers $H^{14}$ and $H^{15}$, a spring acting against pins on the plates $B^3$ and $B^4$ to move said plates oppositely, a latch $H^{13}$ engaging with a pin on the plate $B^2$ and a spring acting against said latch, all coöperating substantially as shown and described and for the purpose stated.

13. In an apparatus of the class described, the combination in operative relation of the parts hereinafter specified, viz., a supporting-plate, an oscillative disk $A'$, an oscillative needle $C'$, a slotted plate $H^{24}$, a bell-crank $H^{25}$, a rod $H^{27}$ having a rack, a pinion $C^4$ driv by the rack on the rod $H^{27}$, a forked bell-crank $H^{23}$, a roulette $a^{21}$ connected with the disk $A'$ and working in the fork of the bell-crank $H^{23}$, a slidable plate $A^3$, a lever $H^{19}$ adapted to move the plate $A^3$, a spring acting against the lever $H^{19}$, a rod $H^{18}$ connected with the bell-crank $H^{23}$ and adapted to throw the lever $H^{19}$, a bell-crank $H^{26}$, a lever $H^9$, a rod $H^7$ connecting the bell-cranks $H^{23}$ and $H^{26}$, a rod connecting the lever $H^9$ with the bell-crank $H^{26}$, a slide $B^8$ operated by the lever $H^9$, a spring acting against the slide $B^8$, plates $B'$, $B^2$, $B^3$ and $B^4$ slidable on the supporting-plate and having pins, a latch $H^{13}$ engaging with the pin on the plate $B^2$, a spring acting against said latch, a bell-crank $H^{12}$ engaged by the slide $B^8$, a secondary lever $H^{14}$ acted against by the bell-crank $H^{12}$ and engaging with a pin on the plate $B^3$, a lever $H^{15}$ acting against the pin on the plate $B^4$, a rod connecting the levers $H^{14}$ and $H^{15}$, a spring acting oppositely against the pins on the plates $B^3$ and $B^4$, substantially as set forth.

In witness whereof we have hereunto subscribed our names, at Springfield, Illinois, this 25th day of December, 1899.

PETER LOFY.
   HARRY C. ETTINGER.

Witnesses:
 FRANK HUDSON,
 N. DU BOIS.

It is hereby certified that in Letters Patent No. 663,236, granted December 4, 1900, upon the application of Peter Lofy and Harry C. Ettinger, of Springfield, Illinois, for an improvement in "Air-Brake-Instruction Charts and Apparatus," errors appear in the printed specification requiring correction, as follows: On page 3, lines 43 and 44, the word *or* should be inserted before the words " to restore;" page 4, line 20, the reference-letters " $a''$, $a^{11}$ " should read $a^{11}$ $a^{10}$; page 5, line 38, the reference-letter $b^3$ should read $B^3$, and same page, line 90, the reference-letter $h^7$ should read $H^7$; and that the said Letters Patent should be read with these corrections therein that the same may conform to the record of the case in the Patent Office.

Signed, countersigned, and sealed this 5th day of February, A. D., 1901.

[SEAL.]

F. L. CAMPBELL,
*Assistant Secretary of the Interior.*

Countersigned:

C. H. DUELL,
*Commissioner of Patents.*